United States Patent
Sagong

(10) Patent No.: US 12,153,447 B2
(45) Date of Patent: Nov. 26, 2024

(54) PHOTOVOLTAIC PANEL MANAGEMENT SYSTEM

(71) Applicant: KUKDONG ENERGY Corp, Gyeongsangbuk-do (KR)

(72) Inventor: Myeong Geon Sagong, Gyeongsangbuk-do (KR)

(73) Assignee: KUKDONG ENERGY Corp, Gyeongsangbuk-do (KR)

( * ) Notice: Subject to any disclaimer, the term of this patent is extended or adjusted under 35 U.S.C. 154(b) by 0 days.

(21) Appl. No.: 17/849,756

(22) Filed: Jun. 27, 2022

(65) Prior Publication Data

US 2023/0133036 A1    May 4, 2023

(30) Foreign Application Priority Data

Oct. 28, 2021 (KR) .................. 10-2021-0146009

(51) Int. Cl.
| | |
|---|---|
| G05D 1/00 | (2024.01) |
| B64C 39/02 | (2023.01) |
| B64U 101/30 | (2023.01) |
| G08G 5/00 | (2006.01) |
| H02S 40/38 | (2014.01) |
| H02S 50/15 | (2014.01) |

(52) U.S. Cl.
CPC .......... G05D 1/104 (2013.01); B64C 39/024 (2013.01); G08G 5/0069 (2013.01); H02S 40/38 (2014.12); H02S 50/15 (2014.12); *B64U 2101/30* (2023.01)

(58) Field of Classification Search
CPC ....................................... G05D 1/104
See application file for complete search history.

(56) References Cited

U.S. PATENT DOCUMENTS

| | | | | |
|---|---|---|---|---|
| 9,950,814 | B1* | 4/2018 | Beckman et al. | ........ B64F 5/40 |
| 2023/0186201 | A1* | 6/2023 | Cella | ................ G05B 19/41885 |
| | | | | 705/7.17 |
| 2023/0196230 | A1* | 6/2023 | Cella | ...................... G06V 10/82 |
| | | | | 705/7.17 |
| 2023/0206329 | A1* | 6/2023 | Cella | .................. G06Q 20/3674 |
| 2023/0214925 | A1* | 7/2023 | Cella | ...................... G06Q 30/06 |
| | | | | 705/37 |
| 2023/0222454 | A1* | 7/2023 | Cella | ........................ G06N 7/01 |
| | | | | 705/28 |
| 2023/0222531 | A1* | 7/2023 | Cella | ................ G06Q 10/06315 |
| | | | | 705/7.31 |
| 2023/0281527 | A1* | 9/2023 | Cella | ...................... G06V 20/17 |
| | | | | 705/7.17 |
| 2023/0289340 | A1* | 9/2023 | Cella | ...................... G06F 16/27 |
| 2023/0290122 | A1* | 9/2023 | Burkett | ................ G06V 20/176 |

FOREIGN PATENT DOCUMENTS

| | | | |
|---|---|---|---|
| DE | 102020111983 A1 | * | 11/2021 |
| KR | 10-2020-0013352 A | | 2/2020 |
| KR | 10-2021-0102029 A | | 8/2021 |

OTHER PUBLICATIONS

Google Machine Translation of KR20210102029A (Sep. 29, 2020).*
Google Machine Translation of KR20200013352A (Jul. 30, 2018).*

* cited by examiner

*Primary Examiner* — Jean Paul Cass
(74) *Attorney, Agent, or Firm* — Revolution IP, PLLC

(57) ABSTRACT

Proposed is a photovoltaic panel management system and, more particularly, to a photovoltaic panel management system that determines the failure and contamination level of a photovoltaic panel and efficiently manages multiple photovoltaic panels by using drones.

1 Claim, 5 Drawing Sheets

[FIG. 1]
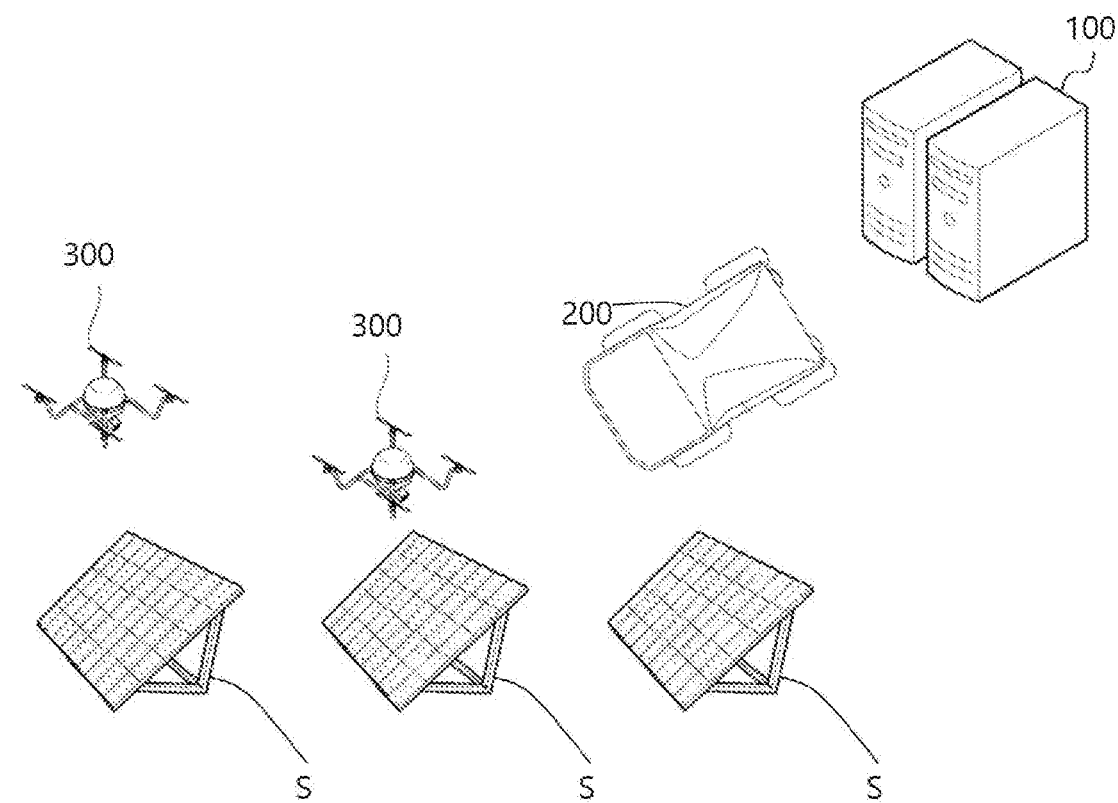

[FIG. 2]
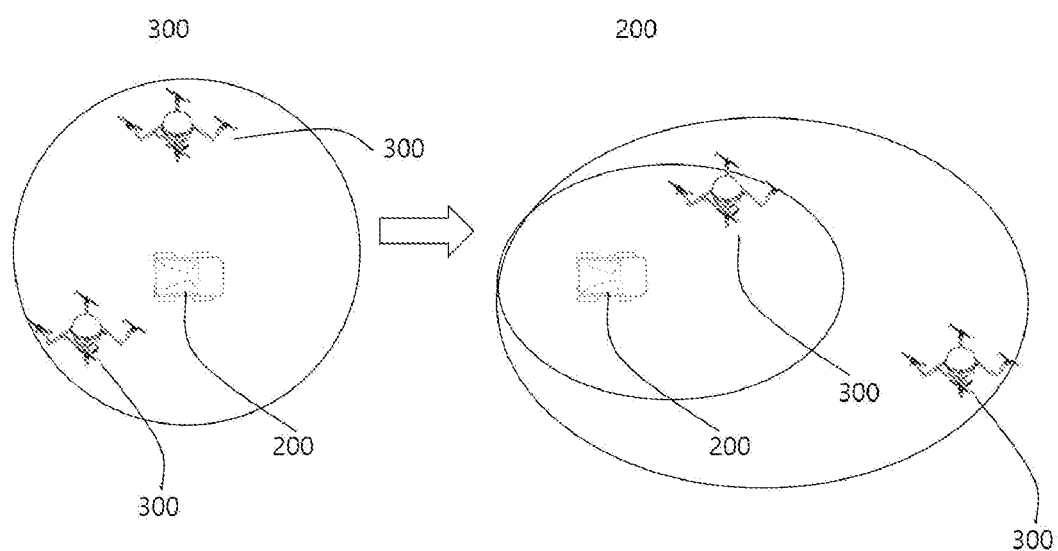

[FIG. 3]
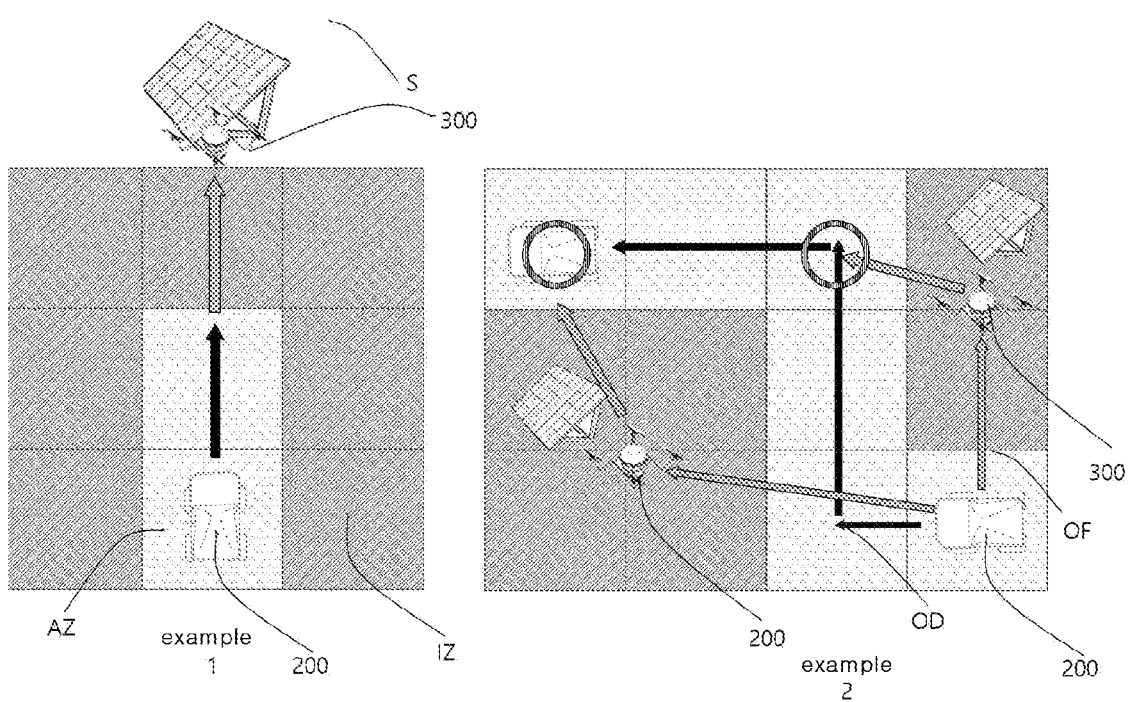

[FIG. 4]
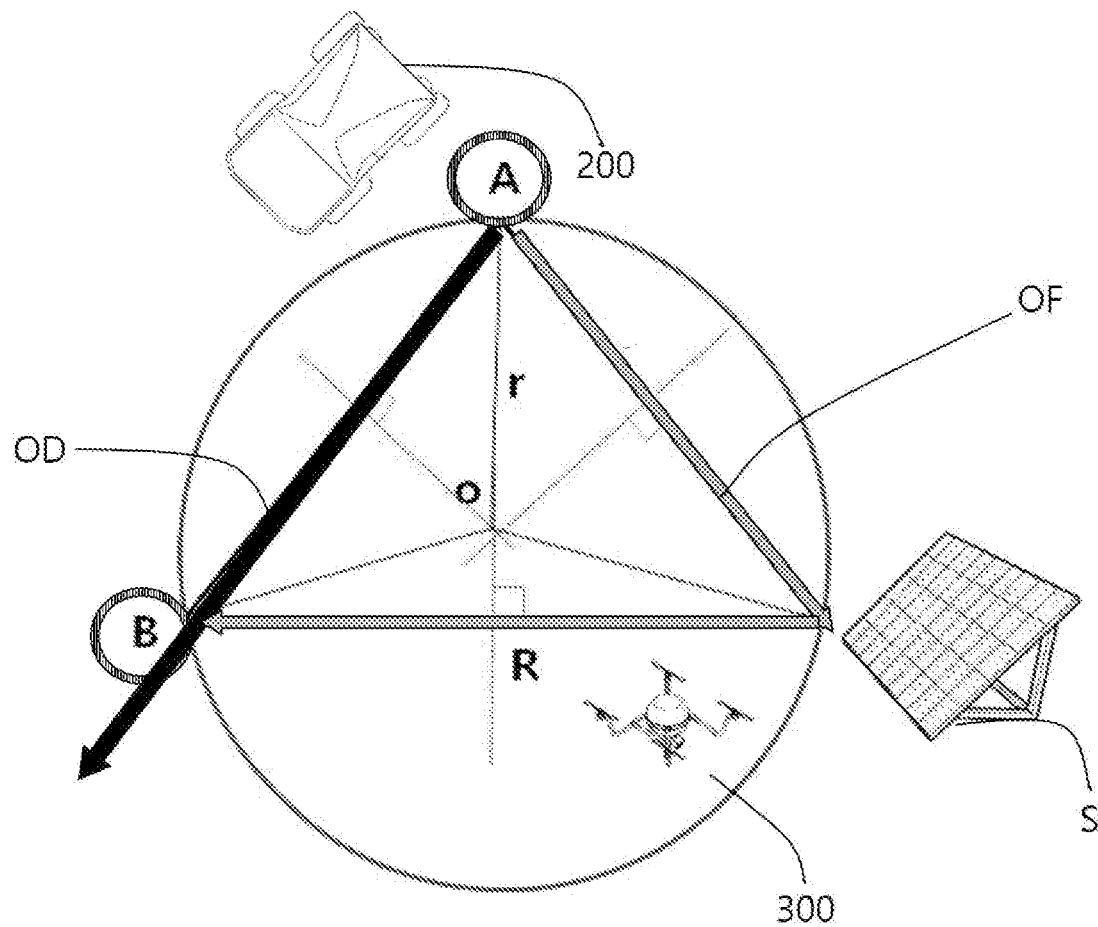

[FIG. 5]
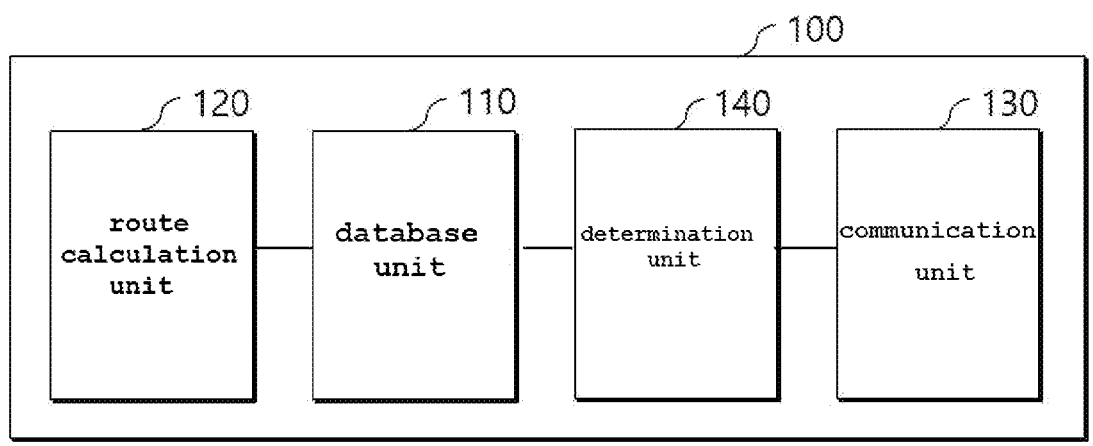

PHOTOVOLTAIC PANEL MANAGEMENT SYSTEM

CROSS REFERENCE TO RELATED APPLICATION

The present application claims priority to Korean Patent Application No. 10-2021-0146009, filed Oct. 28, 2021, the entire contents of which is incorporated herein for all purposes by this reference.

BACKGROUND OF THE INVENTION

Field of the Invention

The present disclosure relates to a photovoltaic panel management system and, more particularly, to a photovoltaic panel management system that determines the failure and contamination level of a photovoltaic panel and efficiently manages multiple photovoltaic panels by using drones.

Description of the Related Art

In general, electricity is produced through thermal power generation, hydroelectric power generation, nuclear power generation, and renewable energy power generation. Despite the advantages of being eco-friendly, the proportion of hydropower and renewable power generation in global electricity generation is small, and the main sources for electrical energy generation are thermal power and nuclear power.

However, countries around the world are trying to move away from the existing supply system relying on fossil fuels and nuclear power to an energy supply system using new and renewable energy sources, and as part of such efforts, many countries have enacted eco-friendly policies such as greenhouse gas reduction and promote the implementation of environmental regulations.

In the meantime, as part of the energy supply by renewables, solar photovoltaic power plants are being installed. In particular, due to the advantage of being naturally supplied with near-infinite energy from the sun without consuming any fuel, large-scale solar photovoltaic power plants have recently been built and operated.

In order to maintain power generation efficiency, solar photovoltaic power plants need to periodically inspect and maintain solar panels (photovoltaic panels). Currently, solar panels are inspected using thermal image information generated from aerial photography using drones, and for inspection of solar panels using drones, accurate flight path information is required.

It is difficult, however, to systematically manage large-scale solar panels installed on a large site using only drones, and there is a limit to the number of drones and flight time, so if the drone flight route is established without taking this into account, efficient maintenance and management of solar panels is impossible.

Documents of Related Art

Patent Documents
 (Patent Document 0001) Korean Patent Application Publication No. 10-2021-0102029 (Aug. 19, 2021)

SUMMARY OF THE INVENTION

Accordingly, the present disclosure has been made keeping in mind the above problems occurring in the related art, and the present disclosure is intended to provide a photovoltaic panel management system that optimizes the flight path of a drone to detect the failure and surface contamination level of a photovoltaic panel, so that the monitoring operation of the drone is performed efficiently, and at the same time, maximizes the flight time of the drone.

In order to achieve the above objective, according to an embodiment of the present disclosure, there is provided a photovoltaic panel management system consisting of a mobile charging station and one or more drones, and configured for operating photovoltaic panels with optimum efficiency by detecting failure and surface contamination levels of a plurality of photovoltaic panels.

The photovoltaic panel management system includes: a control server including: a database unit in which photovoltaic panel information including at least any one of installed location, identification number, and real-time state of the photovoltaic panels and topographic information of a site where the photovoltaic panels are installed are stored, a route calculation unit that generates an optimal driving route of the mobile charging station or an optimal flying route of the drones on the basis of the photovoltaic panel information and the topographic information, a communication unit that communicates with the mobile charging station and the one or more drones through a wireless communication network, and a determination unit that determines a failure and contamination level of a photovoltaic panel on the basis of image data received from the mobile charging station or the drones; the mobile charging station that, while driving on the ground along the optimal driving route provided by the control server, photographs the photovoltaic panels, loads the one or more drones, and charges batteries required to power an operation of the one or more drones; and the one or more drones that photograph the photovoltaic panels while flying along the optimal flying route provided by the control server or the mobile charging station.

According to an embodiment of the present disclosure, the route calculation unit may analyze the topographic information to set a drivable zone and a non-drivable zone of the mobile charging station, and generate the optimal driving route of the mobile charging station and the optimal flying route of the one or more drones.

According to an embodiment of the present disclosure, the route calculation unit may analyze drone information including at least one of charging state of the batteries of the drones and time required for full charging and weather information including at least one of the sun's position and altitude, wind speed, and wind direction to calculate maximum flight radius of the one or more drones based on the mobile charging station, and generate the optimal flying route on the basis of the calculated maximum flight radius.

According to an embodiment of the present disclosure, the optimal driving route of the mobile charging station may include take-off and landing positions of the drones.

According to an embodiment of the present disclosure, the route calculation unit may calculate a virtual circumcenter and circumcircle from any two positions of the optimal driving route and a position of the photovoltaic panels to calculate the take-off and landing positions of the drones and the optimal flying route.

According to the present disclosure, it is possible to systematically manage the failure and surface contamination levels of large-scale photovoltaic panels by introducing a mobile charging station and multiple drones capable of monitoring photovoltaic panels.

Furthermore, by complexly generating the optimal driving route of the mobile charging station and the optimal flying route of a drone, it is possible to efficiently use the limited flight time of the drone and minimize the inspection time for the entire photovoltaic panel.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a conceptual diagram illustrating a photovoltaic panel management system according to an embodiment of the present disclosure;

FIG. 2 is a conceptual diagram illustrating an example of calculating the maximum flight radius of a drone according to an embodiment of the present disclosure;

FIGS. 3 and 4 are conceptual diagrams illustrating an example of calculating an optimal driving route of a mobile charging station and an optimal flying route of a drone according to an embodiment of the present disclosure; and FIG. 5 is a block diagram illustrating a control server according to an embodiment of the present disclosure.

DETAILED DESCRIPTION OF THE INVENTION

Like reference numerals in the drawings refer to the same or similar functions throughout the various aspects.

Hereinafter, detailed contents for carrying out the present disclosure will be described on the basis of embodiments with reference to the accompanying drawings, and the embodiments will be described in sufficient detail to enable those skilled in the art to practice the present disclosure.

It should be understood that the various embodiments of the present disclosure are different but need not be mutually exclusive. For example, certain shapes, structures, and characteristics described herein with respect to one embodiment may be implemented in other embodiments without departing from the spirit and scope of the present disclosure.

Therefore, the detailed description given below is not intended to be taken in a limited sense, and the scope of the present disclosure is limited only by the appended claims, if properly set forth, along with all scope equivalent to that claimed by the claims.

A photovoltaic panel management system according to an embodiment of the present disclosure is to detect the failure and surface contamination levels of photovoltaic panels and manage the photovoltaic panels. The system acquires infrared images or visible light images by moving a mobile charging station and a drone to the area where the photovoltaic panels are installed, and detects the failure and surface contamination level of a photovoltaic panel through image analysis.

DESCRIPTION OF THE COMPONENTS OF A PHOTOVOLTAIC PANEL MANAGEMENT SYSTEM

A photovoltaic panel management system according to an embodiment of the present disclosure includes a control server 100, a mobile charging station 200, and drones 300.

The control server 100 is a component that manages the photovoltaic panel management system, and may determine whether the photovoltaic panel S is faulty and the degree of contamination, and detect the location of photovoltaic panel S defects by analyzing the image data captured by the mobile charging station 200 or the drones 300.

A database unit 110 stores overall photovoltaic panel information about the photovoltaic panels S, such as the installed location, identification number, or real-time status of the photovoltaic panels S and topographic information, that is, map information of a site where the photovoltaic panels S are installed. The topographic information may include a coordinate system including latitude and longitude for each area in which the photovoltaic panels S are installed, and information such as topography of the corresponding area. In addition, the database unit 110 receives the location information and the photographed photovoltaic panel images periodically by area and time from the mobile charging station 200 and the drones 300 and stores those information and images, and stores day data and night data separately.

A route calculation unit 120 generates an optimal driving route OD of the mobile charging station 200 or an optimal flying route OF of the drone 300 on the basis of the photovoltaic panel information and topographic information. In generating the optimal driving route OD and the optimal flying route OF, the shortest distance between the photovoltaic panels S and the mobile charging station 200 or the drone 300 is generally created, but the focus is on creating a route that may minimize the flight time of the drone 300. Such an embodiment will be described later.

A communication unit 130 is a component that communicates with the mobile charging station 200 and the drone 300 through a wireless communication network.

A determination unit 140 determines the failure and contamination level of the photovoltaic panel on the basis of image data received from the mobile charging station 200 or the drones 300, and if a defect occurs in a specific panel, detects the location of the defect.

Generally, if a defect occurs in a part of the photovoltaic panel S, when a voltage is applied between the electrode layers of the photovoltaic panel S, the electric field in the portion where defects occur may become unstable compared to the surrounding area. Due to this unstable electric field, more current flows between the electrode layers in the defective area compared to the surrounding area. In addition, the more current flows, the more heat may be generated.

Accordingly, in the case of a thermal image, the color tone or brightness expressed in the image is different depending on the temperature of the surface of the photovoltaic panel S, so the determination unit 140 derives the temperature distribution of the photovoltaic panel S when the mobile charging station 200 or the drone 300 acquires a thermal infrared image by photographing the photovoltaic panel S. When a partial area of the photovoltaic panel S to be inspected has a higher or lower temperature than the surrounding area in the thermal image, it may be determined that a failure has occurred.

Meanwhile, when there is a fine crack inside the photovoltaic panel S, it may be easily detected through electroluminescence (EL) images.

Contamination of the photovoltaic panel refers to the contamination of the surface of the photovoltaic panel S by foreign substances such as dust adhesion, bird secretions, branches, fallen leaves, and snow in winter. Accordingly, the degree of contamination of the surface of the photovoltaic panel S is determined through various image analysis techniques such as object recognition, color tone, and contrast comparison from the photographed visible light images.

The mobile charging station 200 drives on the ground to the vicinity of the photovoltaic panel S along the optimal driving route OD provided from the control server 100 to photograph the photovoltaic panel S located in the vicinity.

In addition, the mobile charging station 200 is loaded with at least one or more drones 300 and is equipped with a charging means for charging the drone 300 that needs charging. The mobile charging station 200 may be implemented as a manned vehicle that a driver rides and drives, or an autonomous transport robot capable of unmanned driving along a predetermined route. In the embodiment of the present disclosure, for convenience of description, the mobile charging station 200 is assumed to be a predetermined transport robot capable of unmanned driving, but is not limited thereto.

The drone 300 takes a photo of the photovoltaic panel while flying along the optimal flying route OF provided from the control server 100 or the mobile charging station 200.

The mobile charging station 200 and the drone 300 have a photographing means (not shown), a communication means (not shown) and a location receiving means (not shown) in common.

The mobile charging station 200 and the drone 300 are provided with an imaging means for capturing images of the photovoltaic panel S, and the imaging means consists of at least two types of visible light cameras, infrared thermal imaging cameras or EL cameras. In particular, it is preferable that individual tilt, swivel, pivot, elevation, etc. for each camera are possible only in case when a plurality of cameras are installed in the drone 300. However, if that is not the case, it is preferable that the visible light camera is installed so as to take pictures in a vertical direction with respect to the ground and the thermal imaging camera or EL camera is installed to face the surface of the photovoltaic panel S installed obliquely at a predetermined angle with respect to the ground. For the imaging means installed in the mobile charging station 200, it is desirable to install different types of cameras as in the case of drones. However, since there are many restrictions to secure a shooting angle compared to the drone 300 due to the installation location, height, topography, etc. of the photovoltaic panel S, it is desirable that a predetermined adjustment means capable of elevating the cameras and changing the shooting angle be provided.

The mobile charging station 200 and the drone 300 are also provided with the location receiving means. The location receiving means may be configured with a real time kinematic global positioning system (RTK GPS) module on top of a global positioning system (GPS) module. The RTK GPS module receives GPS signals transmitted from the satellite, and generates location information including the real-time location of the mobile charging station 200 and the real-time location of the drone 300 on the basis of the longitude and latitude coordinates included in the received GPS signals. The RTK GPS module measures the current position of the mobile charging station 200 and the current position of the drone 300, and may provide precise location information with a location error within a few centimeters, for example. The RTK GPS module records real-time location information, shooting time, etc. on the image of the photovoltaic panel taken from the mobile charging station 200 and the drone 300, and transmits the image to the control server 100.

The mobile charging station 200 and the drone 300 are provided with the communication means capable of wireless communication through a conventional wireless communication protocol such as wireless local area network (WLAN), wireless fidelity (WiFi), high speed downlink packet access (HSDPA), long-term evolution (LTE), long range (LoRa), and interconnection of communication may be different depending on the data transmitted and received.

For example, it may be considered that the optimal driving route OD of the mobile charging station 200 and the optimal flying route OF of the drone 300 generated by the control server 100 are transmitted directly from the control server 100 to the mobile charging station 200 and to the drone 300, so that the mobile charging station 200 and the drone 300 are moved, and the real-time locations of the mobile charging station 200 and the drone 300 are transmitted to the control server 100.

In addition, regarding the transmission of the photovoltaic panel S images taken from the drone 300 to the control server 100, it may be considered that, by allowing the mobile charging station 200 to operate as a bridge of a predetermined access point AP that relays communication between the control server 100 and the drone 300, the images are transmitted to the mobile charging station 200, and then the mobile charging station 200 transmits the images to the control server 100.

Examples of Generating an Optimal Driving Route and an Optimal Flying Route

Hereinafter, an embodiment in which the route calculation unit 130 of the control server 100 generates the optimal driving route OD of the mobile charging station 200 and the optimal flying route OF of the drone 300 will be described with reference to the drawings.

The route calculation unit 130 firstly analyzes the topographic information to set a drivable zone AZ and a non-drivable zone IZ of the mobile charging station 200. When setting each zone, it is preferable to consider physical dimensions such as length and width of mobile charging station 200, various geographic factors such as topographic slope, the characteristics of the soil, and the exposure of rocks, and installation location or installation height of the photovoltaic panels S. In addition, it is desirable to set a situation where the imaging means of the mobile charging station 200 is not able to photograph the photovoltaic panels S as a non-drivable zone IZ.

When the drivable zone AZ and the non-drivable zone IZ are set, a target point is determined in consideration of the distribution of the photovoltaic panel S, and then the mobile charging station 200 generates an optimal driving route OD to the target point. When generating the optimal driving route OD, it is desirable that the route satisfy the condition that the mobile charging station 200 may photograph as many photovoltaic panels S as possible while moving along the route, and the condition of being the shortest distance to the target point.

According to the embodiment of the present disclosure, in the drivable zone AZ, the mobile charging station 200 moves around to photograph the photovoltaic panel S, while in the non-drivable zone IZ, the drones 300 fly to photograph the photovoltaic panel S. As in Example 1 shown in FIG. 3 of the present disclosure, the mobile charging station 200 is moved to a drivable location to minimize the flying distance of the drones 300, so that the flying distance of the drone 300 may be minimized.

After generating the optimal driving route OD, the optimal flying route OF of the drone 300 is generated so as to photograph the photovoltaic panels S arranged around the optimal driving route OD. At this time, it is desirable that, by analyzing drone information including at least any one of the number of drones 300 ready to fly, the state of charge of batteries of all drones 300, and the time required for full charging, and weather information including at least any one of the sun's position and altitude, wind speed, and wind direction, the maximum flight radius of each drone 300 is calculated, and an optimal flying route is differentially generated for each drone 300. As shown in FIG. 2, a different maximum flight radius is calculated according to the battery charge state of each of the drones 300.

Furthermore, it is desirable to generate an optimal flying route OF in consideration of the position of the sun and the flight time of the drones 300. When a drone 300 is flying, a shadow may appear on the photovoltaic panel S depending on the position of the sun (position of the sun according to the time and altitude of the sun according to seasons) and the flight altitude of the drone 300, and thus it is desirable to generate an optimal flying route OF to minimize the formation of shadows caused by the drone 300 on the surface of the photovoltaic panel S.

As shown in FIGS. 3 and 4, the optimal flying route OF may include an optimal location for taking off and landing of the drone 300 to provide maximum flight efficiency. Since the mobile charging station 200 is continuously moving, unnecessary flight may occur depending on the take-off or landing point of the drone, and since a large number of photovoltaic panels S need to be photographed within a limited flight time, it is important to calculate the optimal flying route considering the drone take-off and landing locations and flight time.

The example shown in FIG. 4 relates to generating take-off and landing locations and the optimal flying route OF without considering external environmental factors (e.g. wind direction, wind volume, altitude of the sun, etc.). In short, if there is a photovoltaic panel S to be photographed at point C, after selecting arbitrary points A and B on the optimal driving route OD, from the coordinate values of points A, B, and C, an imaginary circumcenter O and a circumcircle with radius R are calculated. Among arbitrary points selected on the optimal driving route OD, point A is the optimal take-off position of the drone 300, and point B is the optimal landing position of the drone 300, and lines AC and BC become the optimal flying route OF of the drone 300.

As described above, the present disclosure has been described with specific matters such as specific components, limited embodiments, and drawings. However, these are only provided to aid a more general understanding of the present disclosure, and the present disclosure is not limited to the above embodiments, and various modifications and variations may be made from these descriptions by those skilled in the art to which the present disclosure pertains.

Therefore, the spirit of the present disclosure is not limited to the described embodiments, and not only the claims described below, but also all equivalents or equivalent modifications to these claims shall be within the scope of the spirit of the present disclosure.

What is claimed is:

1. A photovoltaic panel management system consisting of a mobile charging station and one or more drones, and configured for operating photovoltaic panels by detecting failure and surface contamination levels of a plurality of photovoltaic panels, the system comprising:
  a control server comprising:
    a database unit in which photovoltaic panel information including at least any one of installed location, identification number, and real-time state of the photovoltaic panels and topographic information of a site where the photovoltaic panels are installed are stored,
    a route calculation unit that generates a driving route of the mobile charging station and a flying route of the drones on the basis of the photovoltaic panel information and the topographic information,
    a communication unit that communicates with the mobile charging station and the one or more drones through a wireless communication network, and
    a determination unit that determines a failure and contamination level of a photovoltaic panel on the basis of image data received from the mobile charging station or the drones;
  the mobile charging station that, while driving on the ground along the driving route provided by the control server, photographs the photovoltaic panels, loads the one or more drones, and charges batteries required to power an operation of the one or more drones; and
  the one or more drones that photograph the photovoltaic panels while flying along the flying route provided by the control server or the mobile charging station,
  wherein the route calculation unit of the control server analyzes the topographic information to set a drivable zone and a non-drivable zone of the mobile charging station,
    generates the driving route of the mobile charging station and the flying route of the one or more drones, and
    provides the generated driving route to the mobile charging station and provides the generated flying route to the one or more drones,
  wherein the route calculation unit analyzes drone information including at least one of charging state of the batteries of the drones and time required for full charging and weather information including at least one of the sun's position and altitude, wind speed, and wind direction to calculate maximum flight radius of the one or more drones based on the mobile charging station, and generates the flying route on the basis of the calculated maximum flight radius,
  wherein the driving route of the mobile charging station includes take-off and landing positions of the drones,
  wherein the route calculation unit calculates a virtual circumcenter and circumcircle from any two positions of the driving route and a position of the photovoltaic panels to calculate the take-off and landing positions of the drones and the flying route.

* * * * *